(12) United States Patent
Tsubota et al.

(10) Patent No.: US 10,503,173 B2
(45) Date of Patent: Dec. 10, 2019

(54) MOVING DEVICE, NON-TRANSITORY COMPUTER-READABLE MEDIUM, AND CONTROL SYSTEM

(71) Applicant: FUJI XEROX CO., LTD., Tokyo (JP)

(72) Inventors: Hirokazu Tsubota, Kanagawa (JP); Yasuharu Sakurai, Kanagawa (JP); Kunitoshi Yamamoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 222 days.

(21) Appl. No.: 15/583,621

(22) Filed: May 1, 2017

(65) Prior Publication Data

US 2018/0173238 A1 Jun. 21, 2018

(30) Foreign Application Priority Data

Dec. 19, 2016 (JP) ................................. 2016-245401

(51) Int. Cl.
*G05D 1/02* (2006.01)
*G05B 19/418* (2006.01)

(52) U.S. Cl.
CPC ..... *G05D 1/0214* (2013.01); *G05B 19/41895* (2013.01); *G05B 2219/31005* (2013.01); *G05B 2219/50393* (2013.01); *Y02P 90/285* (2015.11); *Y02P 90/60* (2015.11)

(58) Field of Classification Search
CPC ............ G05D 1/0214; G05B 19/41895; G05B 2219/31005; G05B 2219/50393; Y02P 90/60; Y02P 90/285
USPC ................................................ 700/245, 255
See application file for complete search history.

(56) References Cited

U.S. PATENT DOCUMENTS

| 5,279,672 | A | * | 1/1994 | Betker | A47L 11/305 |
| | | | | | 134/18 |
| 5,652,489 | A | * | 7/1997 | Kawakami | G05D 1/0242 |
| | | | | | 318/568.12 |
| 6,393,362 | B1 | * | 5/2002 | Burns | G05D 1/0278 |
| | | | | | 340/940 |
| 8,924,068 | B2 | * | 12/2014 | Shitamoto | G05D 1/0236 |
| | | | | | 701/25 |
| 2003/0212472 | A1 | * | 11/2003 | McKee | G05D 1/0274 |
| | | | | | 700/245 |
| 2008/0162027 | A1 | * | 7/2008 | Murphy | B60W 50/14 |
| | | | | | 701/117 |
| 2011/0166737 | A1 | * | 7/2011 | Tanaka | G05D 1/0274 |
| | | | | | 701/25 |
| 2013/0116880 | A1 | * | 5/2013 | Shitamoto | G05D 1/0236 |
| | | | | | 701/25 |
| 2014/0309835 | A1 | * | 10/2014 | Yamamoto | G05D 1/0217 |
| | | | | | 701/25 |

(Continued)

FOREIGN PATENT DOCUMENTS

JP 2008-009913 A 1/2008
JP 2010-079698 A 4/2010

*Primary Examiner* — Jaime Figueroa
(74) *Attorney, Agent, or Firm* — Oliff PLC

(57) ABSTRACT

A moving device includes a transportation mechanism, a detector, and a controller. The transportation mechanism moves from a departure point to a destination point. The detector detects an obstacle existing on a path to the destination point. When the detector detects that the obstacle exists on the path to the destination point, and another path to the destination point does not exist, the controller controls the transportation mechanism to move to a location that does not impede traffic, and stand by.

11 Claims, 10 Drawing Sheets

(56) References Cited

U.S. PATENT DOCUMENTS

| | | | |
|---|---|---|---|
| 2015/0117995 A1* | 4/2015 | D'Andrea | G06Q 10/08 |
| | | | 414/467 |
| 2016/0112888 A1* | 4/2016 | Hyde | H04W 24/08 |
| | | | 370/252 |
| 2017/0168492 A1* | 6/2017 | Shitamoto | G05D 1/0221 |
| 2017/0190051 A1* | 7/2017 | O'Sullivan | B25J 9/1666 |
| 2018/0333869 A1* | 11/2018 | Ding | B25J 19/06 |

* cited by examiner

MOVING DEVICE, NON-TRANSITORY COMPUTER-READABLE MEDIUM, AND CONTROL SYSTEM

CROSS-REFERENCE TO RELATED APPLICATIONS

This application is based on and claims priority under 35 USC 119 from Japanese Patent Application No. 2016-245401 filed Dec. 19, 2016.

BACKGROUND

Technical Field

The present invention relates to a moving device, a non-transitory computer-readable medium, and a control system.

SUMMARY

According to an aspect of the invention, there is provided a moving device including a transportation mechanism, a detector, and a controller. The transportation mechanism moves from a departure point to a destination point. The detector detects an obstacle existing on a path to the destination point. When the detector detects that the obstacle exists on the path to the destination point, and another path to the destination point does not exist, the controller controls the transportation mechanism to move to a location that does not impede traffic, and stand by.

BRIEF DESCRIPTION OF THE DRAWINGS

An exemplary embodiment of the present invention will be described in detail based on the following figures, wherein.

DETAILED DESCRIPTION

Next, an exemplary embodiment of the present invention will be described in detail and with reference to the drawings.

Figure 1:
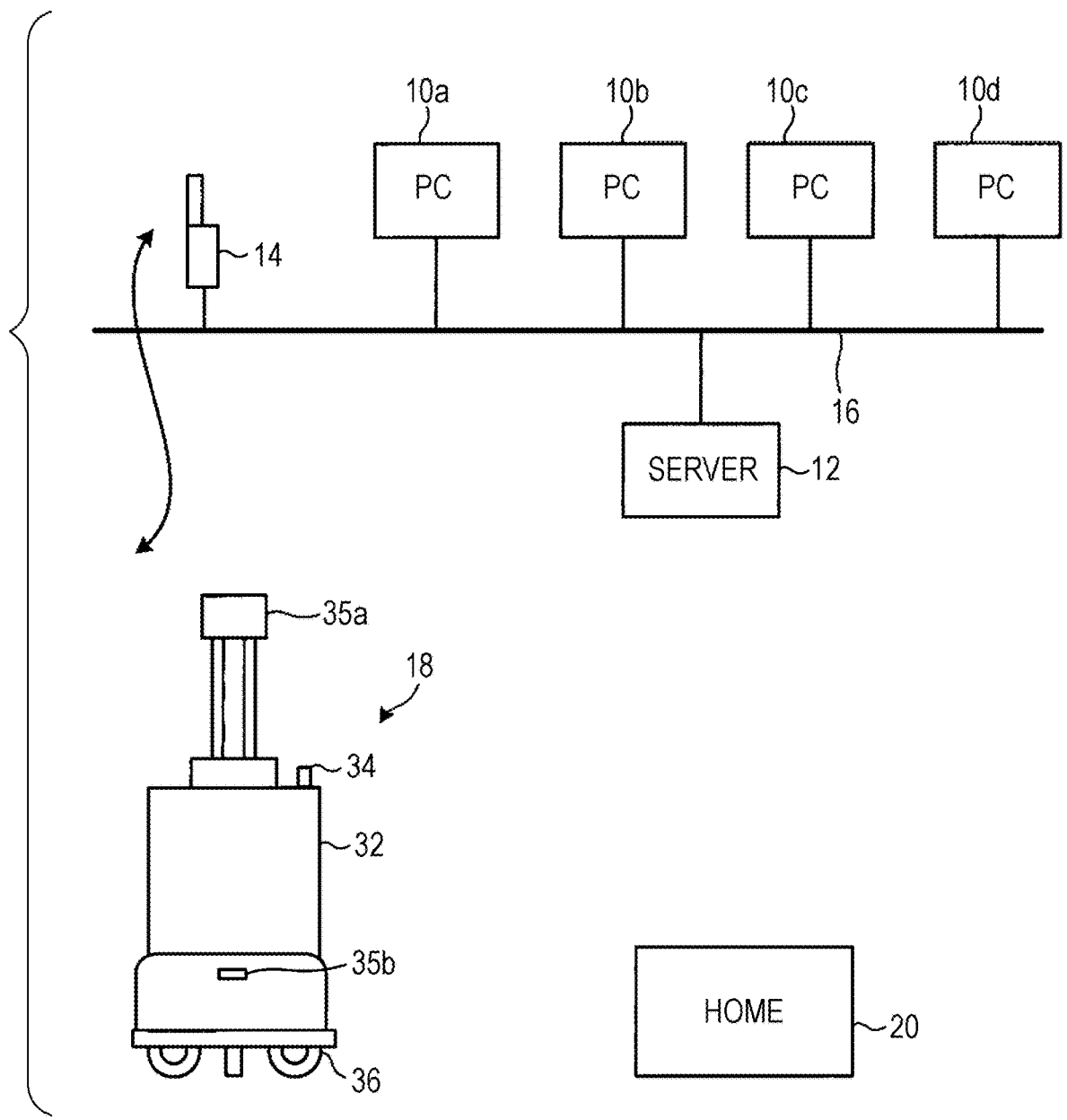
FIG. 1 is a system configuration diagram illustrating a configuration of a service providing system according to an exemplary embodiment of the present invention.

FIG. 1 is a system diagram illustrating a configuration of a service providing system according to an exemplary embodiment of the present invention.

In the service providing system 1 according to an exemplary embodiment of the present invention, four personal computers 10a to 10d, a server 12, and a wireless LAN terminal 14 are connected to each other via a network 16, for example. In addition, an image forming device 18 acting as a moving device that moves to provide services is configured to transmit and receive information such as print data to and from the wireless LAN terminal 14. Additionally, the service providing system 1 is provided with a home position 20 that includes a power outlet and a solar power generation function. The image forming device 18 is configured to stand by in the home position 20.

The personal computers 10a to 10d send print data respectively created by respective users to the server 12.

Figure 2:
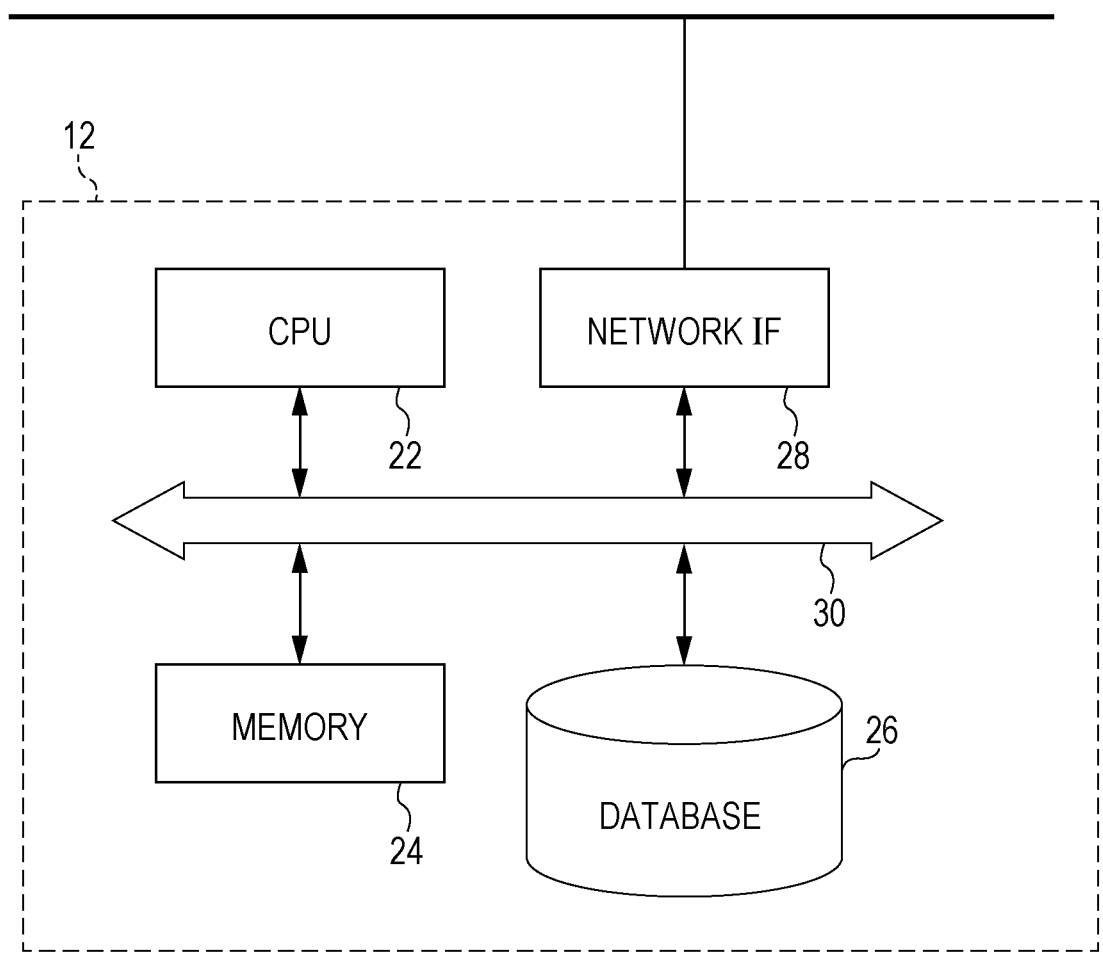
FIG. 2 is a block diagram illustrating a hardware configuration of a server according to an exemplary embodiment of the present invention.

FIG. 2 is a block diagram illustrating a hardware configuration of the server 12. As illustrated in FIG. 2, the server 12 includes a CPU 22, memory 24, a database 26, and a network interface 28, which are connected to each other via a control bus 30.

The CPU 22 executes a predetermined process on the basis of a control program stored in the memory 24, and controls the operations of the server 12.

The memory 24 stores the control program and the print data discussed later.

The database 26 stores a map of an installation location, such as an office where the personal computers 10a to 10d are installed, and the installation positions where the personal computers 10a to 10d are installed.

Note that in the present exemplary embodiment, the server 12 is connected to the personal computers 10a to 10d via a wired network 16, but the server 12 may also be connected by a wireless LAN, or via the Internet as a cloud service.

As illustrated in FIG. 1, the image forming device 18 is self-propelled, and includes a main body 32, a wireless communication unit 34, sensors 35 that acts as a detector, and a movement unit 36 that acts as a transportation mechanism.

The main body 32 is the portion that forms images, and prints print data received by the wireless communication unit 34 onto one or more sheets of paper.

The sensors 35 are made up of a sensor 35a provided on the upper part of the image forming device 18, a sensor 35b provided on the lower front face of the image forming device 18, and a sensor 35c (not illustrated) provided on the lower rear face of the image forming device 18. The sensors 35a, 35b, and 35c detect distance by laser light, for example, and detect the surrounding state and obstacles existing along a path.

The sensor 35a detects the full perimeter (360 degrees) around the image forming device 18, and is used to detect obstacles and also to detect the position of the device itself. The sensor 35b detects a region of approximately 270 degrees from the lower front face of the image forming device 18, and is used to detect obstacles. Meanwhile, the sensor 35c detects a region of approximately 270 degrees from the lower rear face of the image forming device 18, and is used to detect obstacles.

The movement unit 36 receives movement commands from the server 12, and causes the image forming device 18 to move.

Figure 3:
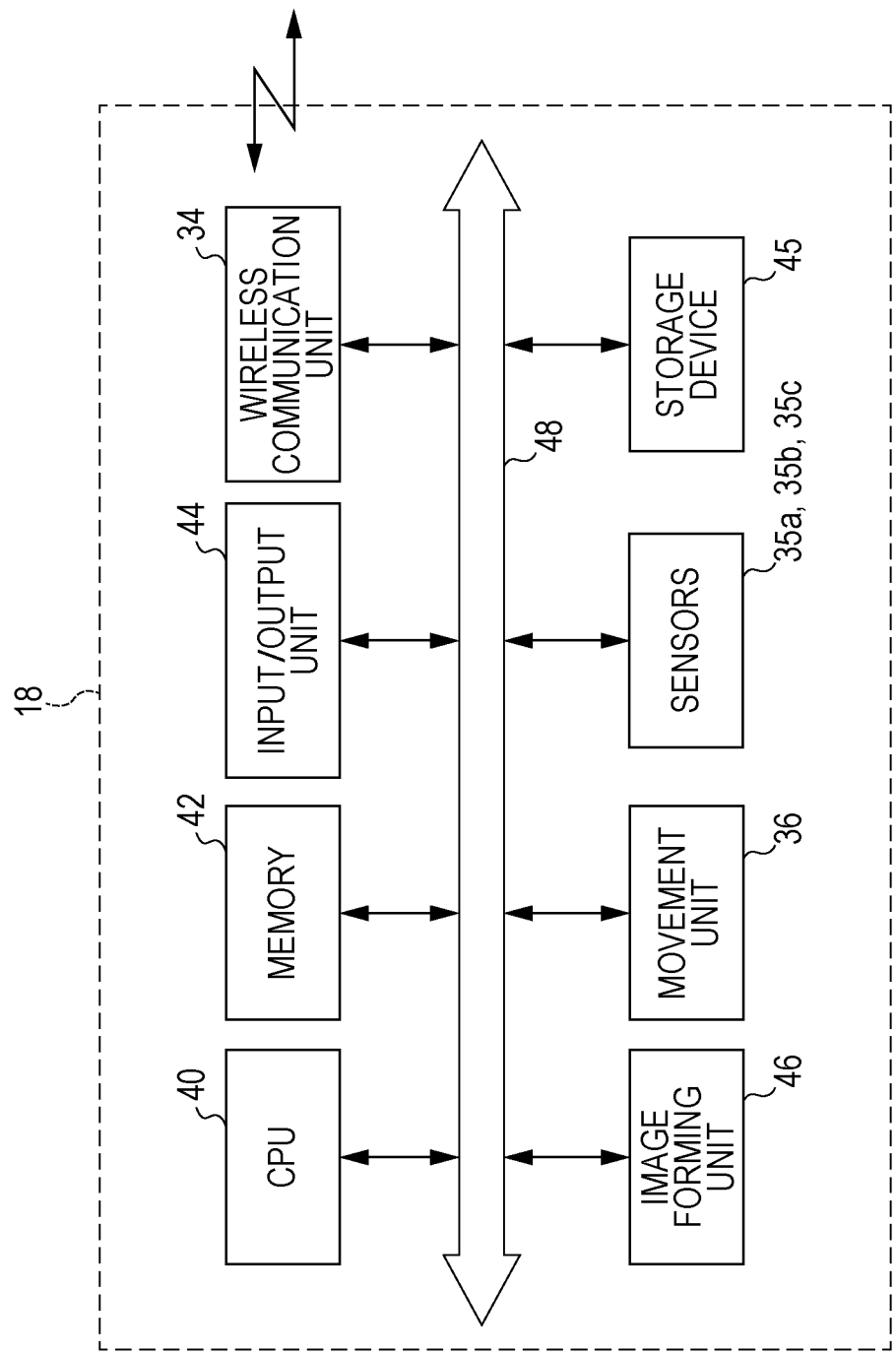
FIG. 3 is a block diagram illustrating a hardware configuration of an image forming device according to an exemplary embodiment of the present invention.

FIG. 3 is a block diagram illustrating a hardware configuration of the image forming device 18. As illustrated in FIG. 3, the image forming device 18 includes a CPU 40, memory 42, an input/output unit 44, a storage device 45, and a wireless communication unit 34, which act as a controller, and an image forming unit 46, the movement unit 36, and the sensors 35a, 35b, and 35c, which act as a service providing mechanism.

The CPU 40 executes a predetermined process on the basis of a control program stored in the memory 42.

The input/output unit 44 accepts input information input by the user, such as a user ID and password. The input/output unit 44 includes an ID input unit by which a user ID is input via an IC card, for example. In addition, the input/output unit 44 is connected to a screen display data output, buttons used for input, audio output via a speaker, and LEDs or the like that display and output the status of the image forming device 18, which act as a user interface.

The wireless communication unit 34 transmits and receives data via a wireless link with the wireless LAN terminal 14.

The storage device 45 stores a map of an installation location, such as an office where the personal computers 10a to 10d are installed, the installation positions where the personal computers 10a to 10d are installed, and past traffic information on the map of the office or other installation location. Also, the storage device 45 stores a past movement history of the image forming device 18.

The image forming unit 46 is the portion that forms images, and prints print data received by the wireless communication unit 34 onto one or more sheets of paper.

When the CPU 40 receives a movement command from the server 12 discussed earlier via the wireless communication unit 34, the movement unit 36 is controlled in accordance with the movement command.

The sensors 35a, 35b, and 35c detect obstacles existing along a path to a destination point. Herein, obstacles encompass dynamic obstacles that move over time, such as people, and static obstacles that do not move over time, such as objects.

In addition, if the sensors 35a, 35b, and 35c detect an obstacle along a path to a destination point, and another path to the destination point does not exist, the CPU 40 controls the movement unit 36 to move to a location that does not impede traffic, and stand by.

Also, in the case of controlling the movement unit 36 to stand by, the CPU 40 informs the user of information related to the standby location.

Herein, the information related to the standby location may be information indicating that the image forming device 18 is standing by at a standby location, information prompting the user to come to the standby location, and the like. Also, the notification method may involve transmitting an email or text notification to the origin from which a print request is transmitted. Alternatively, when a print request is received, information related to the requester may be received together with the request, the mobile terminal of the requester may be specified from the information related to the requester, and a notification may be issued to the specified mobile terminal. In this case, the notification may be issued as a function of an application launched on the mobile terminal.

Figure 4:
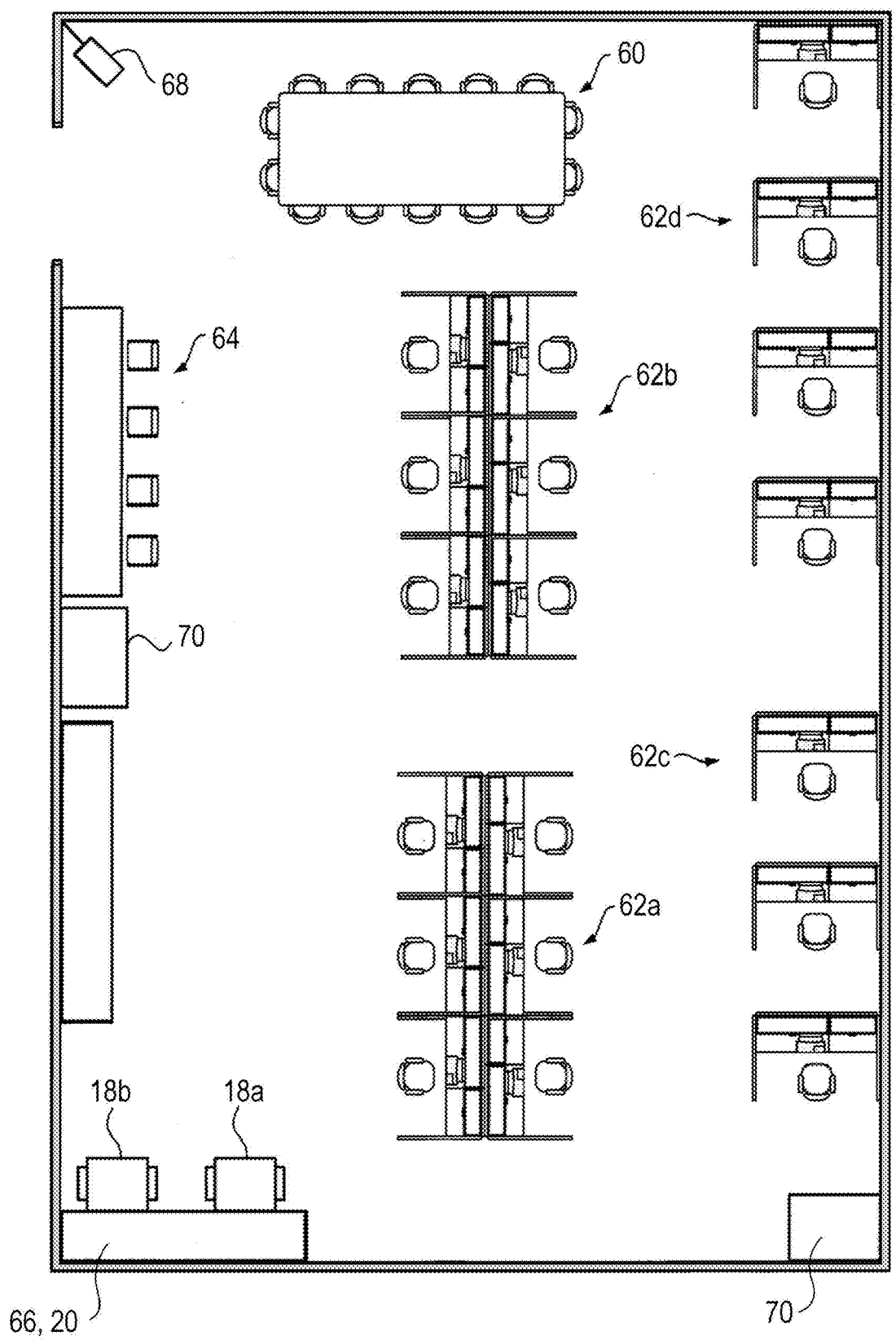
FIG. 4 is a plan view illustrating an office to which an exemplary embodiment is applied.

FIG. 4 is a plan view illustrating an office 58 where the image forming device 18 is stationed.

The office 58 is divided into multiple areas, such as a conference area 60, work areas 62a to 62d, and a reception area 64, for example. In each of these areas 60 to 64, many personal computers 10 are available. Also, a depository 66 that stores goods such as paper and toner is set up in the office 58. From this depository 66, multiple image forming devices, such as two image forming devices 18a and 18b, for example, are able to take in paper and the like. The installation location of the depository 66 may also be treated as the home position 20 of the image forming devices 18a and 18b. In addition, the office 58 is provided with multiple standby locations 70 where the image forming device 18 stands by temporarily. Each standby location 70 may also be provided with a power outlet and a solar power generation function. Also, a monitoring camera 68 is installed in the office 58.

Figure 5:
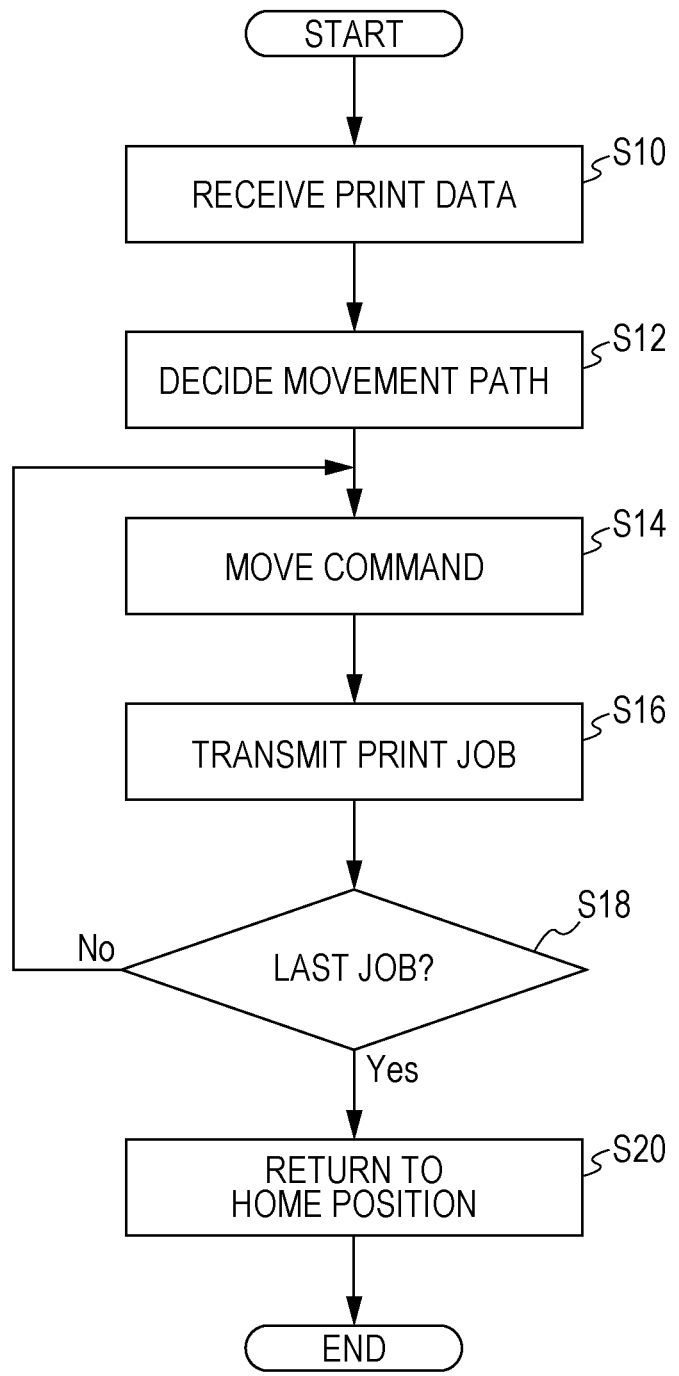
FIG. 5 is a flowchart illustrating a control flow of a server according to an exemplary embodiment of the present invention.
Figure 6:
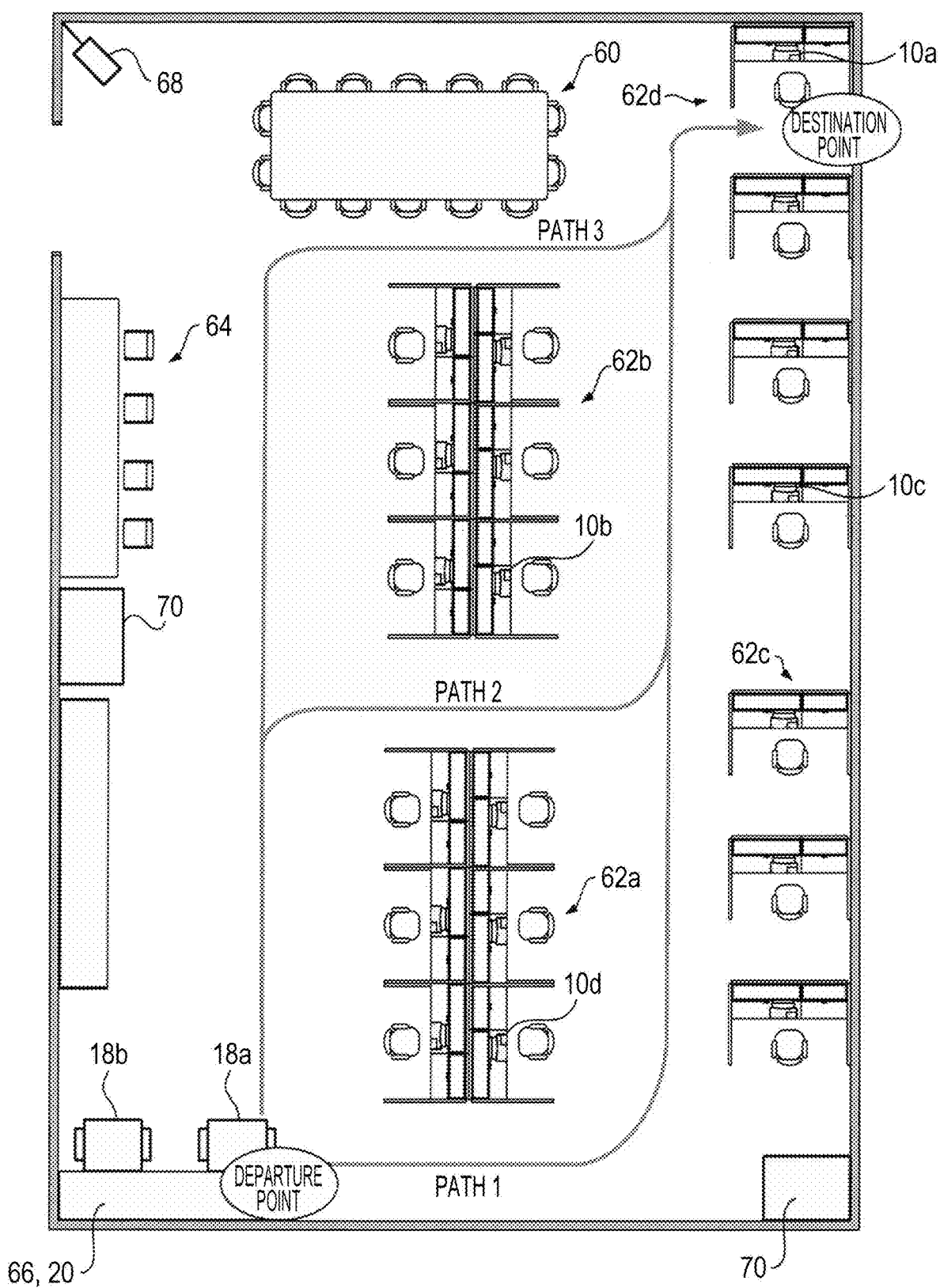
FIG. 6 is a diagram explaining path searching to which an exemplary embodiment of the present invention has been applied.

FIG. 5 is a flowchart illustrating a control flow of the server 12. FIG. 6 is a diagram explaining path searching in which an image forming device 18a moves inside the office 58 from a departure point, namely the home position 20, to a destination point, namely the desk of the user of the personal computer 10a.

First, in step S10, the server 12 receives print data from the multiple personal computers 10a to 10d. The print data includes a print job, the ID of a user using one of the personal computers 10a to 10d, and print settings information (such as color or monochrome, the paper type and size, two-sided or one-sided, the print quality, multi-page printing (such as 2-in-1), and types of postprocessing). If there are multiple sets of print data, the print jobs are stored in the memory 24 as a print job queue in the order in which the print jobs are received.

In the next step S12, one of the personal computers 10a to 10d that transmitted a print job is specified as the destination point from the ID of the user using the corresponding personal computer 10. Subsequently, on the basis of the map of the office 58 and the information related to the installation positions of the personal computers 10a to 10d stored in the database 26, a search is conducted to a find a movement path from the departure point where the image forming device 18a is stationed to the destination point, and the path with the shortest distance is decided as the movement path. Specifically, the personal computer 10a is specified as the destination point, and a search is conducted to find and decide a movement path from the departure point where the image forming device 18a is stationed to the destination point. At this point, as illustrated in FIG. 6, path 1, path 2, and path 3 are found as movement paths, and from among these paths 1 to 3, the path with the shortest distance and the least amount of traffic according to data accumulated in the past, namely path 2, is decided as the movement path.

In the next step S14, sequential movement commands causing the image forming device 18a to move along the decided movement path 2 are output to the image forming device 18a.

In the next step S16, each print job to be printed at each location is transmitted to the image forming device 18a.

When the output of the transmitted print job is completed, in the next step S18, it is determined whether or not that print job is the last print job. If the print job is not the last print job, the flow returns to step S14, the current position is set as the departure point, and sequential movement commands causing the image forming device 18a to move to the location at which to output the next print job (destination point) are output. In step S18, if the print job is determined to be the last print job, the flow proceeds to step S20, the image forming device 18a returns to the home position 20, and the process ends.

Figure 7:
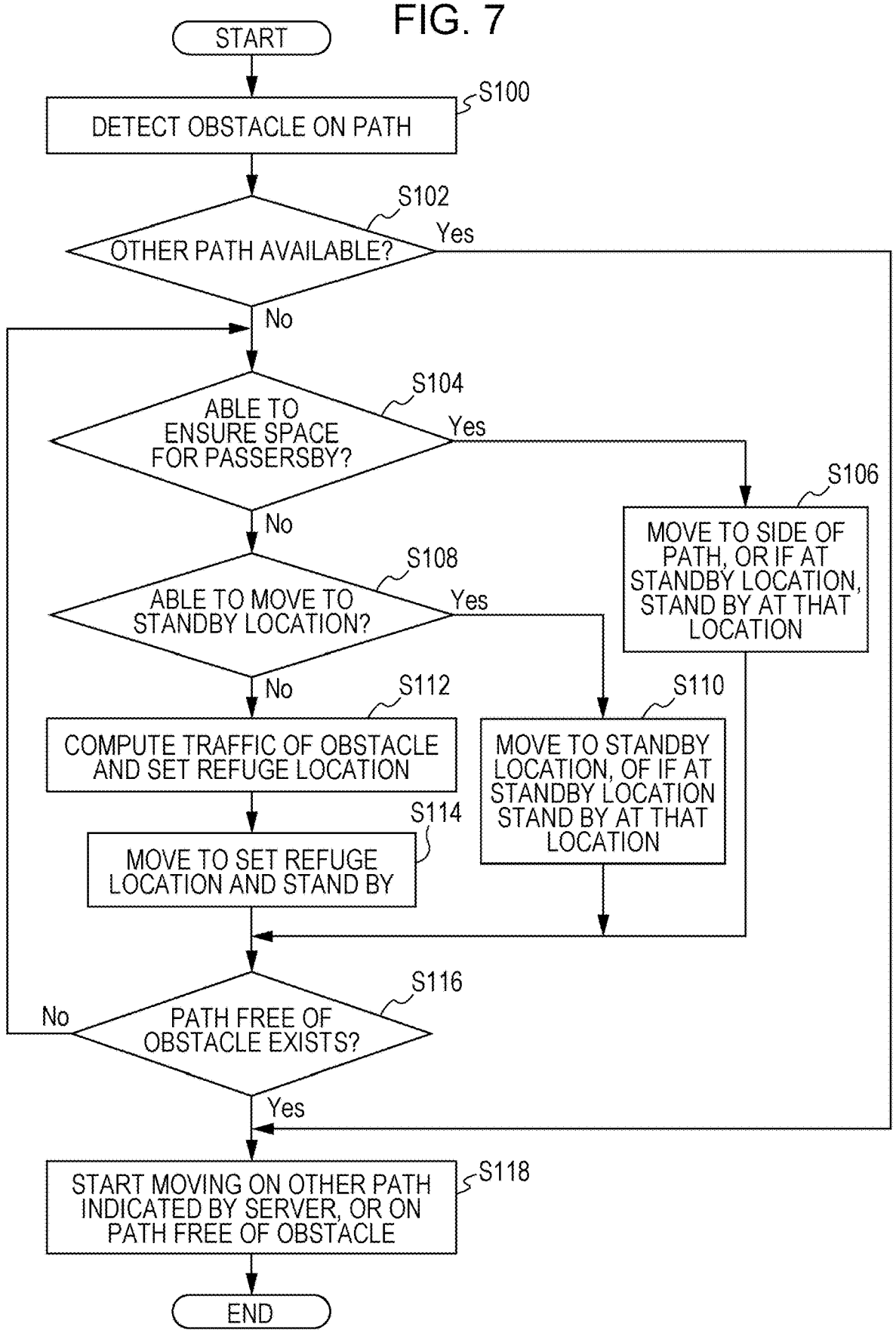
FIG. 7 is a flowchart illustrating a control flow of an image forming device when an obstacle is detected on a path.
Figure 8:
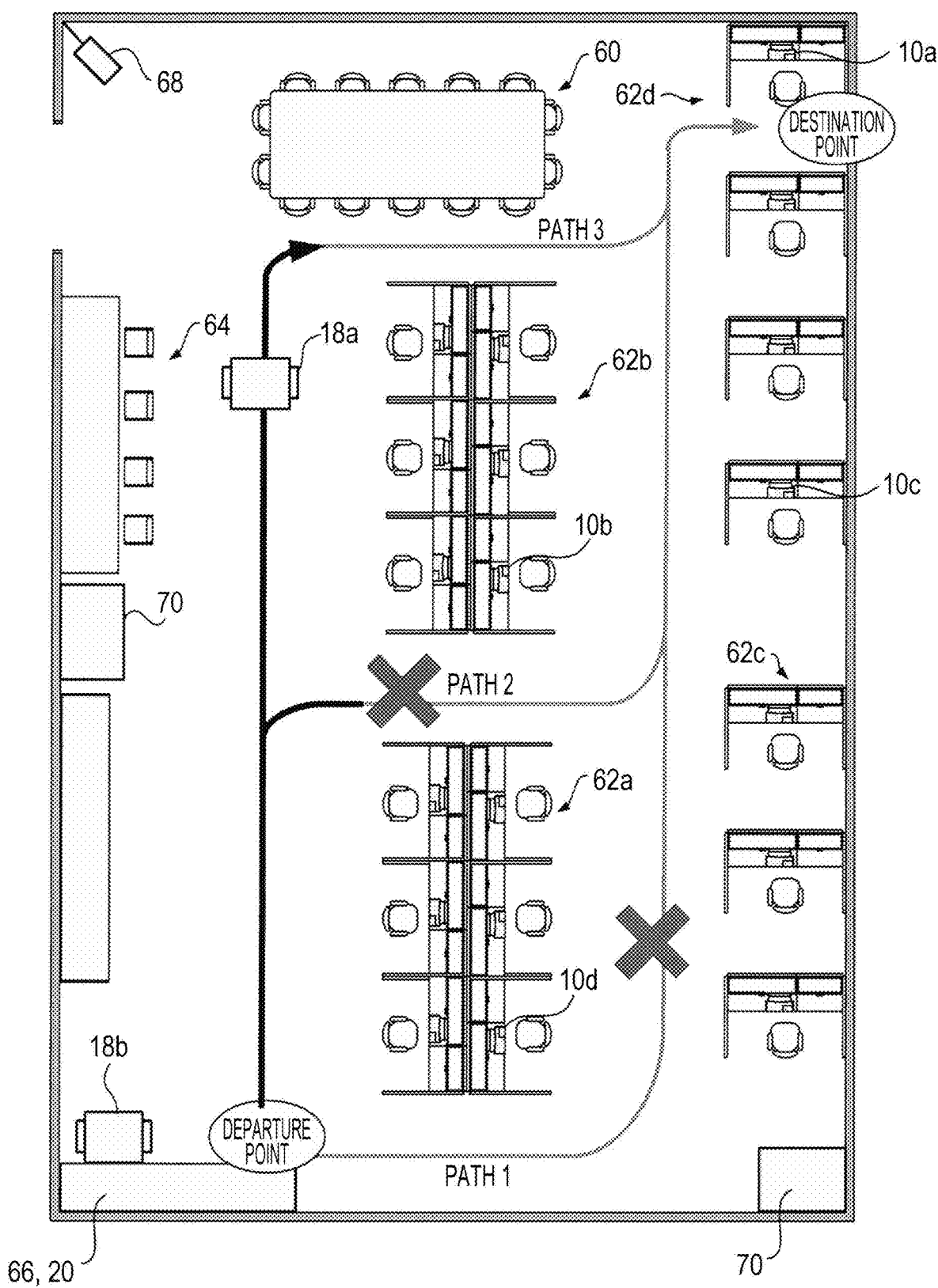
FIG. 8 is a diagram illustrating an example of operations by an image forming device when an open path exists.
Figure 9:
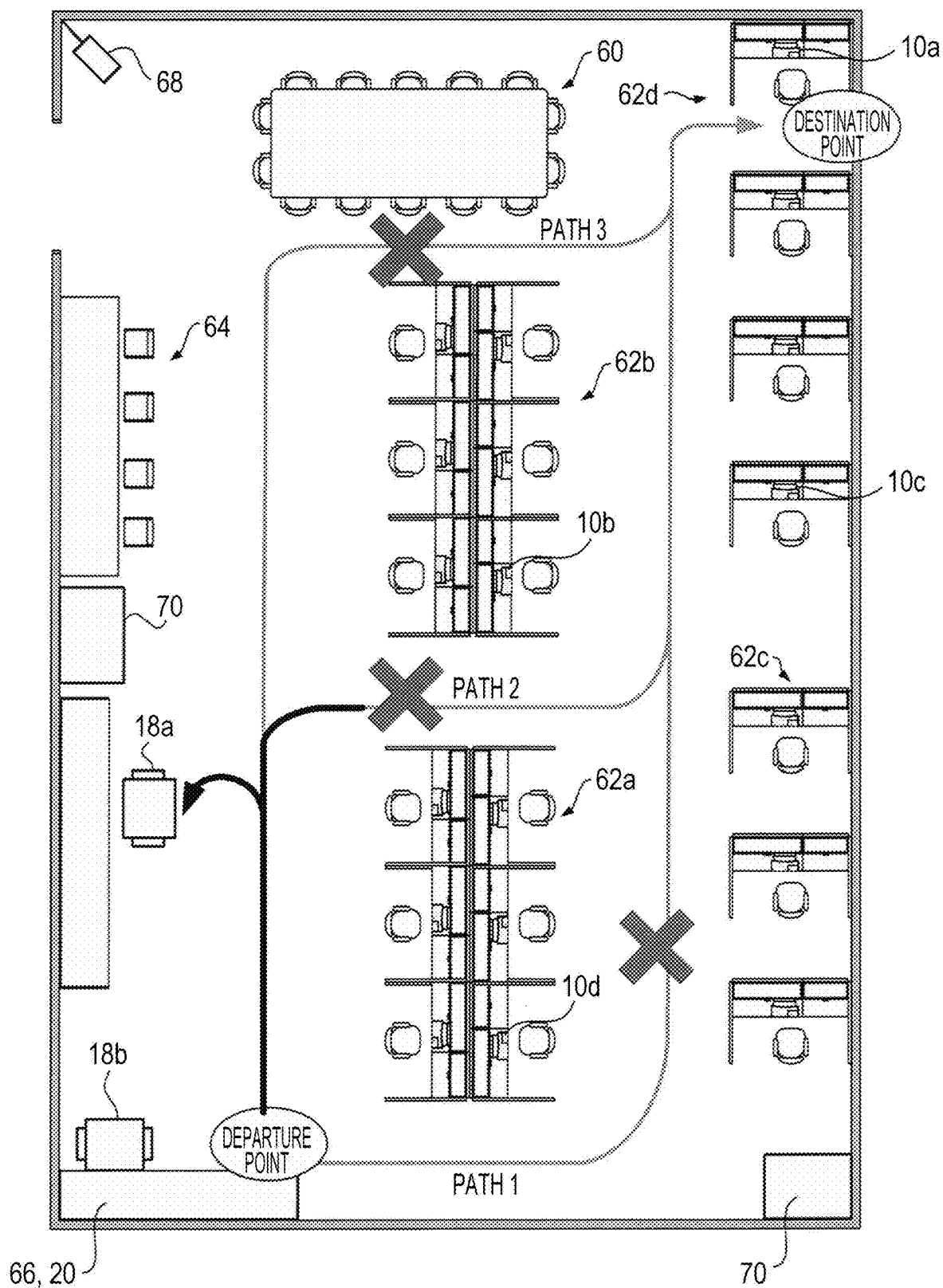
FIG. 9 is a diagram illustrating an example of operations by an image forming device when an open path does not exist.
Figure 10:
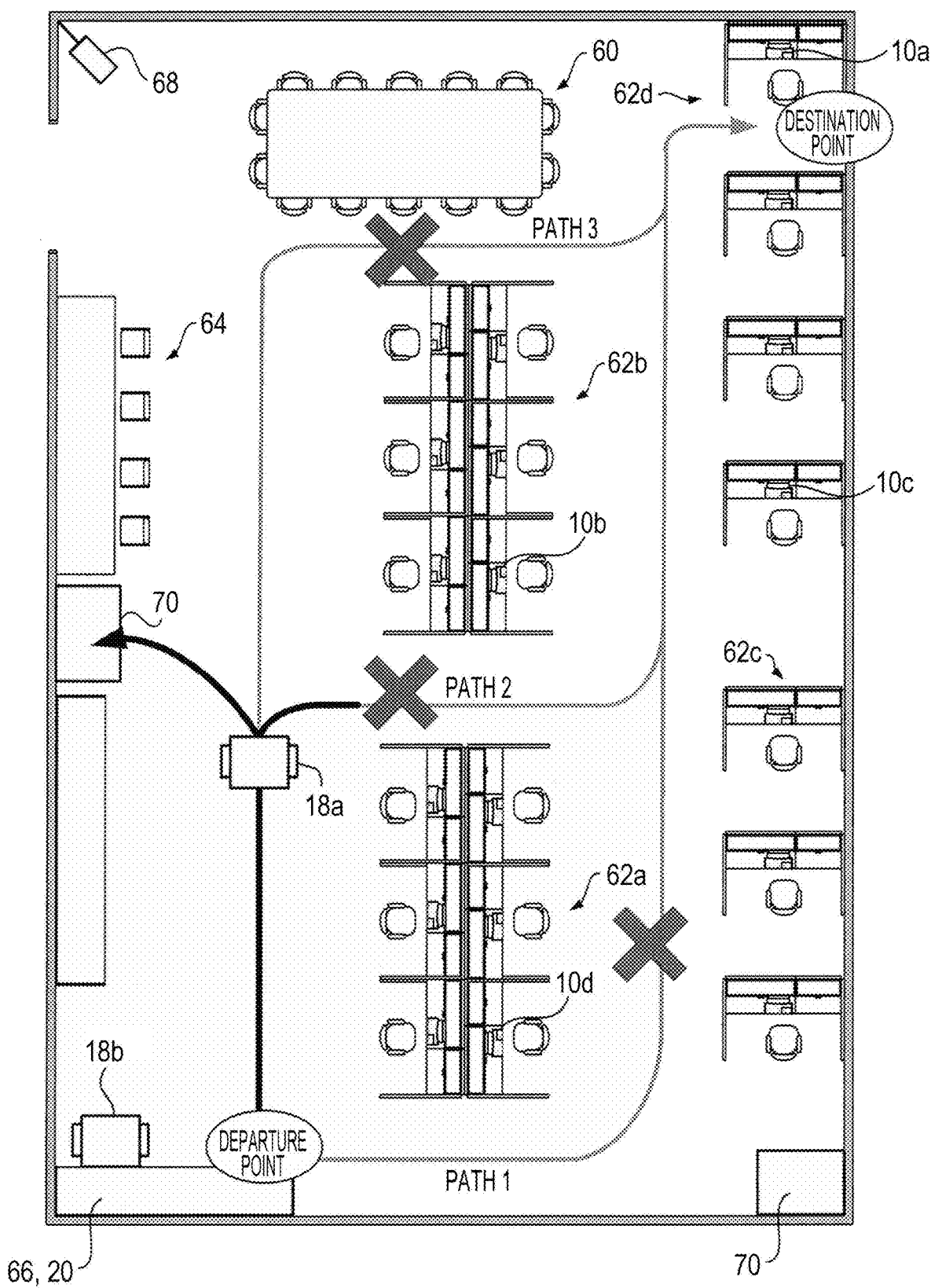
FIG. 10 is a diagram illustrating an example of operations by an image forming device when an open path does not exist.

Next, operations of the image forming device 18a when an obstacle is detected on a path will be described. FIG. 7 is a flowchart illustrating a control flow of the image forming device 18a when an obstacle is detected on a path. FIGS. 8 to 10 are diagrams illustrating how the image forming device 18a moves inside the office 58 from a departure point, namely the home position 20, to a destination point, namely the desk of the user of the personal computer 10a. Note that in FIGS. 8 to 10, an X symbol denotes that an obstacle exists on the path.

If any of the sensors 35a, 35b, and 35c detect an obstacle along the movement path decided by the server 12 along which the image forming device 18a is moving (step S100), the image forming device 18a transmits the detection of the obstacle to the server 12. Specifically, the sensors 35 detect that there is an obstacle on the movement path 2 decided by the server 12.

Subsequently, in the server 12, on the basis of the map of the office 58 and the information related to the installation position of the personal computer 10a stored in the database 26, it is determined whether or not another path exists from the current position to the destination point, and whether or not the path is changeable. If it is determined that the path is changeable, the server 12 transmits an instruction to the image forming device 18a to move to the destination path along the other path. Specifically, as illustrated in FIG. 8, the server 12 detects path 3 as another movement path to the destination point, and transmits an instruction causing the image forming device 18a to move along the detected path 3.

In the image forming device 18a, if another path is indicated in an instruction from the server 12 (step S102, Yes), the image forming device 18a starts moving to the destination point using the indicated other path (step S118). In contrast, if another path is not indicated in an instruction from the server 12 (step S102, No), the image forming device 18a detects the surrounding conditions along the path with the sensors 35a, 35b, and 35c, and determines whether or not space for passersby along the path may be ensured (step S104).

Subsequently, in the case of determining that enough space for passersby along the path may be ensured (step S104, Yes), as illustrated in FIG. 9, the image forming device 18a stands by, moving to the side of the path where there is less traffic to allow people to pass by, and reports the standby location to the user of the image forming device 18a. Consequently, the image forming device 18a is able to reach the destination point faster than in the case of standing by by moving to a location some distance away from the path, such as by moving to the standby location 70. Additionally, the user is able to learn the current position of the image forming device 18a. Also, if the image forming device 18a is at a location such as the standby location 70, the image forming device 18a stands by at that location, and reports the standby location to the user of the image forming device 18a. Subsequently, the flow proceeds to the next step S116.

On the other hand, in the case of determining that enough space for passersby may not be ensured (step S104, No), it is determined whether or not the image forming device 18a is able to move to the standby location 70 (step S108), and if able to move (step S108, Yes), as illustrated in FIG. 10, the image forming device 18a moves to the standby location 70 and stands by, and also reports the standby location to the user of the image forming device 18a (step S110). At this point, the image forming device 18a is configured to stand by after moving by adjusting the movement speed to a slower speed than normal while also detecting the surrounding state along the way to the standby location 70 set up in advance so as to avoid danger nearby (that is, the image forming device 18a conducts evasive action). Consequently, the image forming device 18a is able to avoid becoming an obstacle itself. Also, if the image forming device 18a is at the standby location 70, the image forming device 18a stands by at that location, and reports the standby location to the user of the image forming device 18a. Subsequently, the flow proceeds to the next step S116.

On the other hand, in the case of determining that the image forming device 18a may be unable to move to the standby location 70 (step S108, No), the image forming device 18a computes the traffic of people and objects accumulated in the past, and sets a refuge location (step S112).

Subsequently, the image forming device 18a moves to the set refuge location, stands by, and reports the standby location to the user of the image forming device 18a (step S114).

In other words, if enough space for passersby may not be ensured and the image forming device 18a may be unable to move to the standby location 70 set up in advance, the image forming device 18a extracts a space where there is little movement of people and objects on the basis of traffic information accumulated in the past, and sets the extracted space as a refuge location to move to (that is, the image forming device 18a conducts an operation of taking refuge). Also, a location where few people pass by or a comparatively safe location may be set as the refuge location, on the basis of a past movement history.

In addition, if there is no path allowing movement from the departure point to the destination point, besides standing by at the standby location 70 or at a refuge location, the image forming device 18a may also be configured to select a path on which a dynamic obstacle, such as a person, for example, exists, and move slowly along the selected path. This is because if the obstacle is a person, there is a high probability that the obstacle will be cleared over time. Also, if the obstacle caused by the person's movement is cleared by having the image forming device 18 move slowly, or if a route is acquired as a result of the person noticing the approaching the image forming device 18 and stepping aside, the image forming device 18 switches back to movement at normal speed. If the obstacle is not cleared, the image forming device 18 is configured to stand by at a location such as the home position 20, the standby location 70, or a refuge location.

Subsequently, in step S116, it is determined whether or not a path free of the obstacle exists. If it is determined that a path free of the obstacle does not exist (step S116, No), the flow returns to step S104. If it is determined that a path free of the obstacle exists (step S116, Yes), the image forming device 18 starts moving to the destination point using the path free of the obstacle (step S118). At the point in time when the path is ensured, the image forming device 18 returns to the normal route, the movement path is decided (step S12), and the flow proceeds to the next step S14. By moving at normal speed at the point in time when the path is ensured, the image forming device 18 may be controlled to move to the destination point more quickly.

In addition, the image forming device 18 changes whether the image forming device 18 is to stand by at the home position 20, the standby location 70, or a refuge location, on the basis of information about the surroundings of the home position 20, and information about the time of day. Specifically, for example, control is conducted to change the priority of the home position 20, the standby location 70, and a refuge location at which to stand by depending on the time of day, such as avoiding the home position 20, the standby location 70, or a refuge location that receives direct sunlight at a certain time of day, or avoiding the home position 20, the standby location 70, or a refuge location set up near a place where air blows out, such as by an air conditioner. The image forming device 18 stands by at an optimal home position 20, standby location 70, or refuge location depending on the time of day.

The foregoing exemplary embodiment thus describes a configuration in which the image forming device 18 stores information about the surroundings of the home position 20, the standby location 70, and a refuge location, as well as information about the time of day, and changes the standby location where the image forming device 18 is to stand by depending on the time of day. However, an exemplary embodiment is not limited thereto. For example, a sensor such as an illuminometer may be installed in each home position 20, standby location 70, and the like, measurement results from each illuminometer may be transmitted to the image forming device 18, and the standby location may be changed depending on the transmitted measurement results. Additionally, the standby location may also be changed depending on the switching on and off of a device such as an air conditioner.

Also, the foregoing exemplary embodiment describes a configuration in which the image forming device 18 stores information about the surroundings of the home position 20, the standby location 70, and a refuge location, as well as information about the time of day, and changes the standby location where the image forming device 18 is to stand by depending on the time of day, but an exemplary embodiment is not limited thereto. For example, the server 12 may also store the information about the surroundings of the home position 20, the standby location 70, and a refuge location, as well as information about the time of day, and control the changing of the standby location where the image forming device 18 is to be stand by depending on the time of day.

Also, the foregoing exemplary embodiment describes an example in which the map of the office 58 or the like and information related to the installation position of the personal computer 10a is stored in the database 26 of the server 12, but an exemplary embodiment is not limited thereto. For example, the image forming device 18 may also search for a movement path on the basis of a map of the office 58 or the like and information related to the installation position of the personal computer 10s stored in the storage device 45, and conduct control to move from the departure point to the destination point.

Also, the foregoing exemplary embodiment describes an example in which an obstacle is detected by the sensors 35 of the image forming device 18, but an exemplary embodiment is not limited thereto. For example, the monitoring camera 68 may also be configured to detect an obstacle and transmit information to the image forming device 18, or an obstacle may be detected by sharing information with another image forming device 18.

Note that in the foregoing exemplary embodiment, the image forming device 18 is configured to move to the locations where the personal computers 10a to 10d are installed, but an exemplary embodiment is not limited thereto. For example, the image forming device 18 may also move to a location specified by the user, or the user may be made to carry a position emitter, and the image forming device 18 may be configured to move to the location of the position emitter.

In the exemplary embodiment described above, the image forming device 18 is given as an example of a service providing device, but an exemplary embodiment is not limited thereto. The service providing device may be any type of device that moves to provide a service, and an exemplary embodiment is also applicable to devices such as food and drink serving devices that move.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A moving device, comprising:
   a transportation mechanism that moves from a departure point to a destination point;
   a detector that detects an obstacle existing on a path to the destination point;
   a setting unit that sets a refuge location on a basis of traffic information accumulated in the past; and
   a controller that is configured to:
      when the detector detects that the obstacle exists on the path to the destination point, and another path to the destination point does not exist, control the transportation mechanism to move to a location that does not impede traffic, and stand by, and
      control the transportation mechanism to move to the refuge location set by the setting unit, and stand by.

2. The moving device according to claim 1, wherein
   when the detector detects that the obstacle exists on the path to the destination point, and another path to the destination point does not exist, the controller controls the transportation mechanism to move to a preset standby location and stand by.

3. The moving device according to claim 1, wherein
   when the detector detects that the obstacle exists on the path to the destination point, and another path to the destination point does not exist, the controller controls the transportation mechanism to make space allowing people to pass by on the current path, and stand by.

4. The moving device according to claim 1, wherein
   the setting unit sets the refuge location in an order of priority on a basis of at least one of information about surroundings and time of day.

5. The moving device according to claim 1, further comprising:
   a selector that, when the detector detects that the obstacle exists on the path to the destination point, and another path to the destination point does not exist, selects the path in which the obstacle on the path is a dynamic obstacle, wherein
   the controller controls the transportation mechanism to move slowly on the path selected by the selector, and after the dynamic obstacle is cleared, move at a normal speed.

6. The moving device according to claim 5, wherein if the dynamic obstacle is not cleared within a certain amount of time, the controller controls the transportation mechanism to move to a preset standby location and stand by.

7. The moving device according to claim 1, further comprising:
a service providing mechanism that provides a service by moving via the transportation mechanism.

8. The moving device according to claim 7, further comprising:
a reporting unit that reports information about a standby location to a user who requests a service to be provided by the service providing mechanism.

9. A non-transitory computer readable medium storing a program causing a computer to execute a process for moving, the process comprising:
moving from a departure point to a destination point;
detecting an obstacle existing on a path to the destination point;
setting a refuge location on a basis of traffic information accumulated in the past;
controlling, when the obstacle existing on the path to the destination point is detected, and another path to the destination point does not exist, to move to a location that does not impede traffic, and stand by; and
controlling to move to the refuge location set by the setting unit, and stand by.

10. A control system, comprising:
a transportation mechanism that moves from a departure point to a destination point;
a detector that detects an obstacle existing on a path to the destination point;
a setting unit that sets a refuge location on a basis of traffic information accumulated in the past; and
a controller that is configured to:
when the detector detects that the obstacle exists on the path to the destination point, and another path to the destination point does not exist, control the transportation mechanism to move to a location that does not impede traffic, and stand by, and
control the transportation mechanism to move to the refuge location set by the setting unit, and stand by.

11. The moving device according to claim 2, wherein the controller is further configured to, when it is determined that enough space for passersby may not be ensured and the transportation mechanism is determined to be possibly unable to move to the standby location, extract a space where there is little movement of people and objects on the basis of the traffic information accumulated in the past, and set the extracted space as the refuge location, and the controller controls the transportation mechanism to move to the refuge location and stand by.

* * * * *